No. 634,648. Patented Oct. 10, 1899.
H. R. LAMB.
DEVICE FOR JOINING INTERSECTING WIRES.
(Application filed Apr. 1, 1899.)
(No Model.)
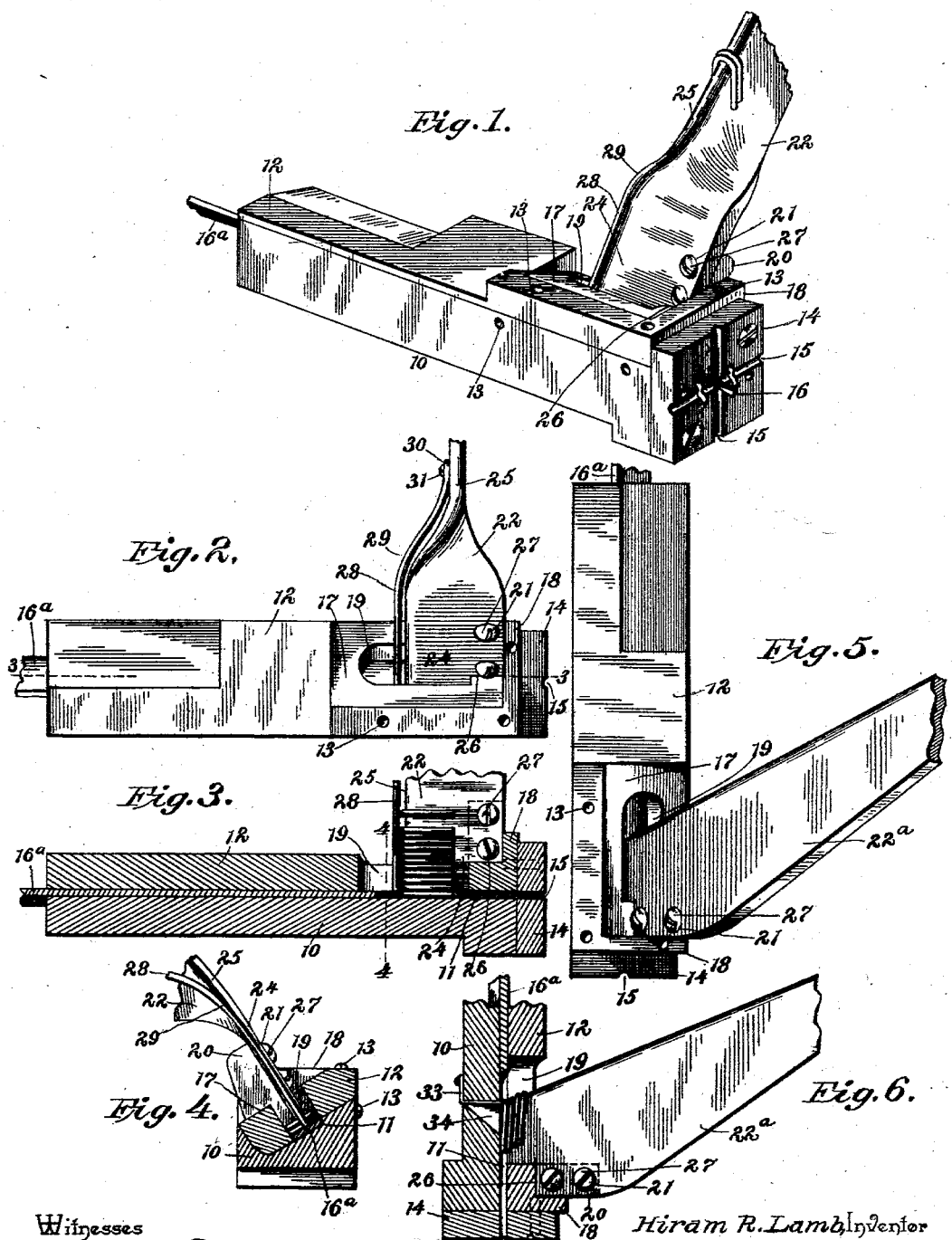
Witnesses
Howard D. Orr.
H. F. Beuhef
Hiram R. Lamb, Inventor
By his Attorneys,
C. A. Snow & Co.

UNITED STATES PATENT OFFICE.

HIRAM R. LAMB, OF ADRIAN, MICHIGAN, ASSIGNOR TO THE LAMB WIRE FENCE COMPANY, OF SAME PLACE.

DEVICE FOR JOINING INTERSECTING WIRES.

SPECIFICATION forming part of Letters Patent No. 634,648, dated October 10, 1899.

Application filed April 1, 1899. Serial No. 711,359. (No model.)

*To all whom it may concern:*

Be it known that I, HIRAM R. LAMB, a citizen of the United States, residing at Adrian, in the county of Lenawee and State of Michigan, have invented a new and useful Feed Mechanism for Wire-Fabric Machines, of which the following is a specification.

My invention relates to feed mechanism for wire-fabric machines, and it is more particularly designed for use in connection with machines of that class which employ a reciprocating plunger fitted operatively to a die-stock, an example of such a machine being disclosed by United States Letters Patent No. 472,059, granted to George M. Lamb and myself on April 5, 1892.

One object of the present invention is to provide a feed mechanism of simple construction arranged to automatically supply by the force of gravity the staple-fasteners which are employed to unite intersecting or crossed wires of a fabric, such fasteners being delivered in proper position and in advance of the plunger that serves to detain the feed of the column of fasteners during the period when said plunger is operated to unite one fastener to the crossed wires. The feeder of my invention is in a position convenient to the attendant for placing the staple-fasteners thereon by hand, and said feeder is readily applicable to or removable from the die-stock of the wire-fabric machine.

A further object of the invention is to provide the feeder with means for holding the staple-fasteners in engagement with a track-surface of said feeder in order to prevent the gravity-fed fasteners from flying off the feeder as they approach the die-stock, and this detaining or guard device is yieldable with relation to the track-surface to exert a slight tension on the staple-fasteners, which, however, does not hinder the feed of such fasteners by gravity.

The invention consists in the combination, with a die-stock and a reciprocating plunger fitted operatively thereto, of a feeder arm or bar arranged in an inclined position to said stock and having a track-surface on which the staple-fasteners may be applied to straddle said feeder-arm.

The invention further consists in the combination, with a die-stock and a plunger, of a feeder-arm arranged to supply staple-fasteners in the path of said plunger and a guard-finger arranged contiguous to the track-surface of the feeder-arm at the delivery end thereof.

The invention further consists in the novel construction and arrangement of parts, which will be hereinafter fully described and claimed.

To enable others to understand the invention, I have illustrated a preferred embodiment thereof in the accompanying drawings, forming a part of this specification, and in which—

Figure 1 is a perspective view of a die-stock with my feeder mechanism applied thereto, said die-stock being arranged to work in a horizontal position. Fig. 2 is a plan view of the part shown by Fig. 1. Fig. 3 is a longitudinal section on the plane indicated by the dotted line 3 3 of Fig. 2. Fig. 4 is a transverse section on the plane indicated by the dotted line 4 4 of Fig. 3. Fig. 5 is a view of a die-stock arranged to work in a vertical position and having a straight feeder-arm in active relation thereto. Fig. 6 is a cross-section through Fig. 5 to show the detaining-spring.

Similar numerals of reference are used to indicate corresponding parts in each of the several figures of the drawings.

The die-stock 10 is provided in one side or face with a longitudinal raceway 11 for the accommodation of a reciprocating plunger. Against the side of the die-stock in which the longitudinal raceway 11 is produced I apply a face-plate 12, which matches with the stock and serves to close the open side of the raceway 11, said face-plate being secured firmly and detachably in position on the stock by the bolts or screws 13. At the working end of the die-stock and its face-plate a die 14 is provided or attached, said die being produced in the end face of the stock or made in a separate piece and attached firmly to said stock. In the drawings the die 14 is represented as constructed in a separate piece and secured firmly to the end of the stock 10. Said die 14 is provided with wire-grooves 15, and certain of these grooves are intersected by a slot 16, that occupies a position diagonally across the die 14, and this slot provides for the passage of the staple-fasteners through the die in order that said fasteners may be joined by the action of the plunger to the crossed or intersecting wires of the fabric. The slot 16 in the die is in alinement with the raceway 11, and the plunger 16ª is adapted to reciprocate in this raceway and the diagonal slot of the die. The end of the face-plate 12 contiguous to the die 14 is formed with an inclined recessed face 17, and the lower extremity of said face-plate has a foot-flange 18, that extends outwardly at right angles to the plane of the face-plate. Said face-plate is furthermore provided with a longitudinal feed-slot 19, which opens into or communicates with the plunger-raceway of the die-stock, and at one side of the slot and contiguous to the foot-flange 18 is formed an offstanding rib or flange 20, adapted for the attachment of the feeder arm or bar, which constitutes the leading feature of my present invention. The offstanding rib or flange 20 is provided with a series of threaded holes 21 to receive the screws or bolts by which the feeder-arm is secured detachably in places on the die-stock.

The feeder-arm 22 is arranged in an inclined position with relation to the longitudinal axis of the die-stock in order that the staple-fasteners, which are fitted to said feeder-arm, may gravitate toward the feed-slot 19, that opens into the raceway. Said feeder-arm 22 consists of a metallic bar, which is provided with a quarter-twist at a point intermediate its length, whereby the feeder-arm is given a semispiral contour. By giving the feeder-arm the quarter-twist it is provided with the short delivery end 24, and one edge of this feeder-arm is rounded to provide the track-surface 25 on said arm, the track-surface extending continuously of the feeder-arm and partaking of the curvature or twist thereof. The short delivery end 24 of the feeder-arm is formed with a notch 26, which enables the arm to be fitted to the die-stock, for the extremity of said arm to extend into the feed-slot 19, the lower edge of the arm to rest upon the foot-flange 18, and for one of the lateral faces of the arm to bear against the offstanding rib or flange 20. The inner delivery end 24 of the feeder-arm is thus fitted or applied to the face-plate of the die-stock to rest or have firm bearing thereon, and said end of the arm is secured in a fixed position on the face-plate by the screws 27, which pass through openings adjacent to the notched end of the arm and are screwed into the threaded holes 21 in the rib or flange 20 of the face-plate.

To prevent the staple-fasteners from leaving the track-surface of the feeder-arm, I employ the guard-finger 28, constructed, preferably, of wire and attached to the feeder-arm for the major portion of said guard-finger to lie parallel to the track-surface 25 at the twisted part thereof and along the delivery end 24 of the feeder-arm. In the drawings this guard-finger is shown as having one end thereof bent, as at 28, and formed with an eye 30 to enable said end of the guard-finger to be applied laterally against the feeder-arm at a point to one side of its track-surface 25, and said finger is fastened in place by a screw 31, which passes through the eye 30 and is fixed in the feeder-bar. The guard-finger is curved to lie adjacent to the spiral or twisted length of the track-surface 25, and said finger thus extends parallel to the track-surface on the delivery end 24 of the arm 22, the extremity of the finger terminating at the delivery end of the bar and in the foot-slot 19 of the face-plate.

The described construction and arrangement of the feeder-bar with relation to the die-stock cause the track-surface 25 to be presented in a position convenient to the operator for placing the staple-fasteners on the feeder-arm, and the inner extremity of this arm terminates in the feed-slot 19, contiguous to the path of the reciprocating plunger 16ª. The inclination of the feeder at an angle to the axis of the die-stock insures the feeding of the staple-fasteners automatically to the feed-slot and raceway of the die-stock, because the staples will slide by gravity along the smooth track-surface of said feeder-arm. The guard-finger operates to engage with the staple-fasteners at the quarter-twisted section of the feeder-arm, and said guard-finger serves to maintain the staple-fasteners in engagement with said track-surface, so that they will be presented in proper position to enter the raceway in advance of the reciprocating plunger.

In the construction heretofore described the die-stock is arranged to work in a horizontal position, or substantially so, and the twisted feeder-arm occupies the inclined position to present the upper part of the track-surface in a vertical plane for the convenient application of the staples and also to convey the staple-fasteners to the slot in said stock; but the horizontal disposition of the die-stock and the employment of the twisted feeder-arm are not strictly necessary, because I may arrange the die-stock in a vertical position and use a straight inclined feeder-arm, as shown by Figs. 5 and 6. The die-stock has the raceway for one plunger and the slotted face-plate, as heretofore described, and said stock carries the straight feeder-arm 22ª, which is inclined at an angle of about thirty degrees from the point of attachment to the die-stock. Said stock is also provided with a light spring detent or finger 33, arranged to extend into the plunger-raceway, (see Fig. 6,) and said spring detent or finger is secured in an aperture 34 in the die-stock, so as to have its free end contiguous to or in contact with the inner lower end of the feeder-arm. The spring detent or finger is thus arranged to support the staple when it drops into the raceway in the upward movement of the plunger, and the staple is thus held in the path of the following staples to prevent movement of the latter on the feeder-arm and into the raceway. The detent or spring-finger is depressed by the downward movement of the plunger and automatically resumes its normal position after the said plunger rises and clears it.

In the operation of the machine the die-stock with the die are advanced and retracted in order to separate the die 14 with relation to its companion die and to make the two dies close together for engaging with the crossed or intersecting wires previous to the application of the staple-fastener to said wires at the point where they intersect one with the other. A number of the staples are applied or fitted in any suitable way—as, for instance, by hand—to the feeder-arm, and one of the staples is in a position to enter the raceway 11. When the die-stock is moved and the dies are closed on the crossed wires, the plunger 16ª being in a retracted position, the staple at the end of the feeder-arm is free to enter the raceway 11 in the path of the plunger. This plunger is now operated to force the staple through the raceway 11 and the slot 16 in the die 14, whereby the staple is operated on by the dies for twisting the ends of said staple around the wires adjacent to the point of intersection thereof. The advancement of the plunger to drive the staple interposes said plunger into the path of the column of staples on the feeder-arm, and the feed or movement of the staples is thus arrested by the operation of the plunger. On the separation of the dies and the retraction of the plunger to permit advancement or feed of the wire fabric another staple-fastener at the end of the feeder-bar is free to drop into the raceway 11 of the die-stock, and when the dies are closed the plunger is again advanced to drive the staple thus interposed in its path and arrest the feed of the remaining column of staples.

Changes in the form, proportion, size, and the minor details of construction within the scope of the appended claims may be resorted to without departing from the spirit or sacrificing any of the advantages of this invention.

What I claim is—

1. In a device for joining intersecting wires, the combination of a die provided with twisting-grooves and with a feed-slot, a die-stock fast with said die and having a raceway in alinement with said slot, a twisted feeder-arm attached to said stock to occupy an inclined position with relation to the axis thereof and provided with a continuous track-surface, and a reciprocating plunger fitted slidably in the raceway of the stock whereby said feeder-arm presents its track-surface in a convenient position for application to staple-fasteners, substantially as described.

2. In a device for joining intersecting wires, the combination of a die provided with twisting-grooves and a feed-slot, a die-stock fast with said die and having a raceway in alinement with said slot and with a lateral feed-slot which communicates with said raceway, a feeder-bar attached to said stock for one end of said bar to extend into the feed-slot thereof, and a plunger in the raceway to travel adjacent to the delivery end of said feeder-bar, for the purpose described, substantially as set forth.

3. In a feed mechanism for wire-fabric machines, the combination of a die-stock provided with a longitudinal raceway and with a feed-slot which opens laterally through said stock and communicates with the raceway therein, a twisting-die fast with the stock and having a slot which is in alinement with the raceway in said die-stock, a feeder-arm attached to the die-stock at one side of the die to occupy an inclined position to the axis of the stock, said feeder-arm having its delivery end extended through the feed-slot to supply staple-fasteners by gravity to the raceway, and a reciprocating plunger fitted operatively in said raceway, for the purpose described, substantially as set forth.

4. In a feed mechanism for wire-fabric machines, a die-stock provided with a raceway, and a face-plate secured to said stock and provided with a feed-slot and with flanges contiguous to said slot, combined with a notched feeder-arm fitted to the flanges and extended into the feed-slot, means for securing said feeder-arm to one of said flanges, a twisting-die fast with the stock and having a slot in alinement with the raceway, and a plunger fitted in the raceway and traveling adjacent to the delivery end of the feeder-arm, substantially as described.

5. In a feed mechanism for wire-fabric machines, the combination of a die-stock, a slotted twisting-die fast with the stock, a plunger fitted operatively in the stock to force the fasteners through the slot in the twisting-die, a twisted feeder-arm arranged to deliver fasteners in the path of said plunger, and a guard-finger lying contiguous to a portion of the track-surface on the feeder-arm, substantially as described.

6. In a feed mechanism for wire-fabric machines, the combination with a die-stock having a laterally-opening feed-slot, and a plunger fitted operatively to said stock, of a twisted feeder-arm secured to the stock to extend into its feed-slot and provided with a continuous track-surface, and a yieldable guard-finger attached to the feeder-arm and disposed contiguous to the straight and twisted sections of its track-surface, for the purpose described, substantially as set forth.

7. In a device for joining intersecting wires, the combination of a die adapted to receive and confine cross-wires and provided in its working face with twisting-grooves adapted to receive a fastener, a die-stock having said die attached thereto, said stock provided with a raceway, a reciprocating plunger in said raceway, a staple-feeding device for delivering staples in the path of said plunger, a spring-actuated detent adapted to arrest and maintain said staples in the way of the plunger, which detent is adapted to be depressed by a downward movement of the plunger and returned to its normal position as the plunger is withdrawn.

In testimony that I claim the foregoing as my own I have hereto affixed my signature in the presence of two witnesses.

HIRAM R. LAMB.

Witnesses:
W. H. BURNTRUM,
CHAS. G. HART.